United States Patent
Thiercelin et al.

(10) Patent No.: US 10,895,968 B2
(45) Date of Patent: Jan. 19, 2021

(54) GRAPHICAL USER INTERFACE CUSTOMIZATION IN A MOVABLE OBJECT ENVIRONMENT

(71) Applicant: DJI Research LLC, Burbank, CA (US)

(72) Inventors: Arnaud Thiercelin, San Francisco, CA (US); Dhanushram Balachandran, Redwood City, CA (US); Hai Vo, San Francisco, CA (US); Weifeng Liu, Fremont, CA (US); Joshua Lafayette Austin, San Jose, CA (US)

(73) Assignee: DJI Research LLC, Burbank, CA (US)

( * ) Notice: Subject to any disclaimer, the term of this patent is extended or adjusted under 35 U.S.C. 154(b) by 0 days.

(21) Appl. No.: 15/697,757

(22) Filed: Sep. 7, 2017

(65) Prior Publication Data
US 2018/0067631 A1    Mar. 8, 2018

Related U.S. Application Data

(60) Provisional application No. 62/385,207, filed on Sep. 8, 2016.

(51) Int. Cl.
*G06F 3/0484* (2013.01)
*G06F 9/451* (2018.01)
*G06F 9/448* (2018.01)
*G06F 3/0481* (2013.01)

(52) U.S. Cl.
CPC ........ *G06F 3/04845* (2013.01); *G06F 9/4494* (2018.02); *G06F 9/451* (2018.02); *G06F 3/0481* (2013.01); *G06F 3/0484* (2013.01)

(58) Field of Classification Search
CPC .. G06F 3/0481; G06F 3/0484; G06F 3/04845; G06F 9/4494; G06F 9/451
See application file for complete search history.

(56) References Cited

U.S. PATENT DOCUMENTS

| | | | | |
|---|---|---|---|---|
| 7,360,168 B2* | 4/2008 | Bertram | ................ | G06F 3/0483 715/777 |
| 9,452,678 B1* | 9/2016 | Boss | ...................... | B60K 35/00 |
| 9,817,396 B1* | 11/2017 | Takayama | ............ | G05D 1/0038 |
| 2006/0085106 A1* | 4/2006 | Gaudiano | .............. | G01C 11/00 701/23 |
| 2006/0112339 A1* | 5/2006 | Struthers | ................ | G06F 9/451 715/733 |
| 2009/0172986 A1* | 7/2009 | Fuchsberg | .............. | G09F 9/372 40/610 |

(Continued)

OTHER PUBLICATIONS

Richter, C.: Visualizing Sensor Data. In: Media Informatics Advanced Seminar on Information Visualization (2009) (Year: 2009).*

*Primary Examiner* — Andrea N Long
(74) *Attorney, Agent, or Firm* — Nicholson De Vos Webster & Elliott LLP

(57) ABSTRACT

Techniques are disclosed for user interface management in a movable object environment. A user interface manager can request sensor data associated with a movable object from a data manager. The user interface manager can provide the sensor data to one or more user interface elements associated with the user interface element. A first rendering of the at least one user interface element can be caused to be displayed in a user interface, the first rendering determined based on a type or amount of the sensor data associated with the movable object.

29 Claims, 13 Drawing Sheets

(56) References Cited

U.S. PATENT DOCUMENTS

| | | | |
|---|---|---|---|
| 2010/0084513 A1* | 4/2010 | Gariepy | B64C 39/024 244/190 |
| 2011/0060994 A1* | 3/2011 | Maxwell | G06F 3/147 715/730 |
| 2011/0082615 A1* | 4/2011 | Small | B60K 35/00 701/36 |
| 2012/0023157 A1* | 1/2012 | Roth | H04L 67/306 709/203 |
| 2012/0331137 A1* | 12/2012 | Olsen | G06Q 30/02 709/224 |
| 2013/0293452 A1* | 11/2013 | Ricci | G02B 27/01 345/156 |
| 2015/0077276 A1* | 3/2015 | Mitchell | H04W 4/021 340/995.1 |
| 2016/0297540 A1* | 10/2016 | Yochum | G01C 21/165 |
| 2016/0364248 A1* | 12/2016 | Zimmerman | G08G 5/0034 |
| 2017/0045884 A1* | 2/2017 | Kablaoui | G05D 1/0022 |
| 2017/0235018 A1* | 8/2017 | Foster | B64D 45/00 702/5 |
| 2017/0372259 A1* | 12/2017 | Lesser | B64D 1/08 |
| 2018/0196591 A1* | 7/2018 | Hernandez | G06F 3/04845 |

\* cited by examiner

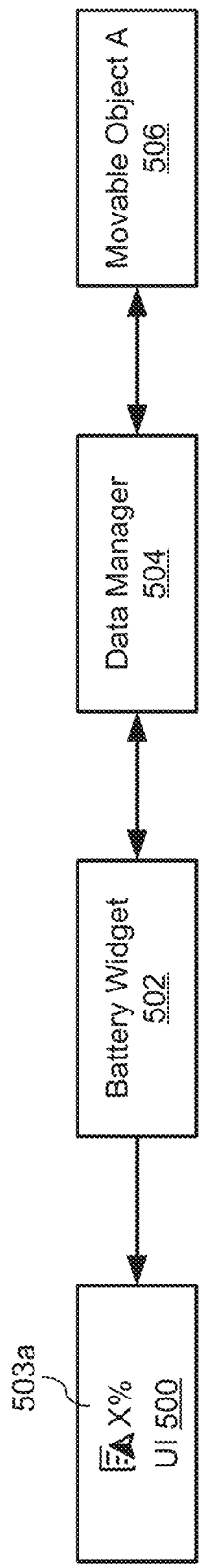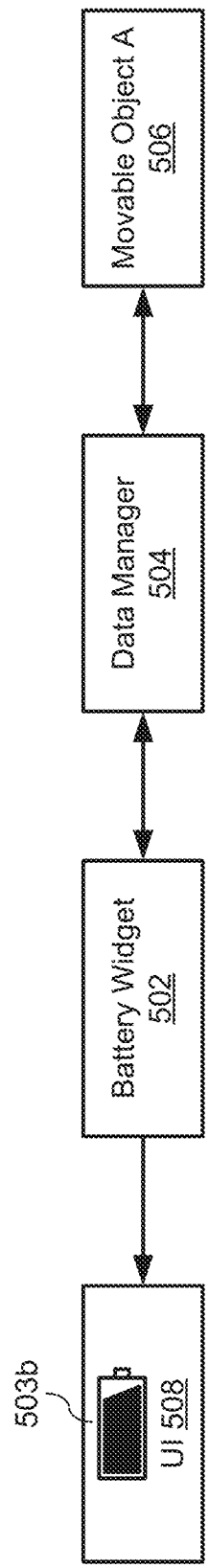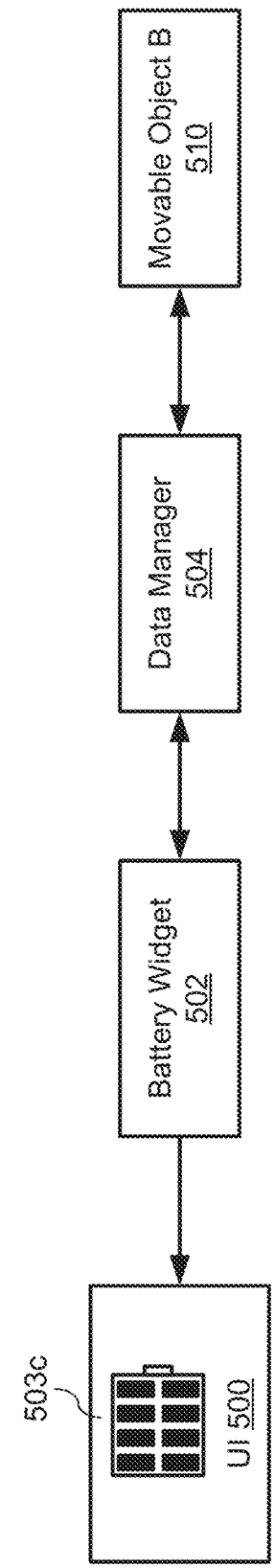

ions of the present invention.
GRAPHICAL USER INTERFACE CUSTOMIZATION IN A MOVABLE OBJECT ENVIRONMENT This application claims priority from U.S. Provisional Patent Application No. 62/385,207 filed on Sep. 8, 2016, the content of which is incorporated herein by reference.

FIELD OF THE INVENTION

The disclosed embodiments relate generally to techniques for customizing graphical user interfaces in a movable object environment and more particularly, but not exclusively, to a software development kit for user interface management.

BACKGROUND

Aerial vehicles such as unmanned aerial vehicles (UAVs) can be used for performing surveillance, reconnaissance, and exploration tasks for various applications. Developers can create domain specific apps that enable users to use the UAV to perform various actions related to these applications. Development of these domain specific apps typically also requires creation of a new user interface for these apps. However, while developers have the domain specific knowledge for these apps, they often do not have specialized user interface experience, making it difficult and time consuming to implement working apps. Additionally, many UI features are shared across apps regardless of the domain, making such development efforts duplicative.

SUMMARY

Described herein are techniques for user interface management in a movable object environment. A user interface manager can request sensor data associated with a movable object from a data manager. The user interface manager can provide the sensor data to one or more user interface elements associated with the user interface element. A first rendering of the at least one user interface element can be caused to be displayed in a user interface, the first rendering determined based on a type or amount of the sensor data associated with the movable object.

BRIEF DESCRIPTION OF DRAWINGS

FIGS. 5A-5C illustrate examples of widget configurability in a user interface, in accordance with various embodiments of the present invention.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The following description of the invention describes user interface management for a movable object. For simplicity of explanation, an unmanned aerial vehicle (UAV) is generally used as example of a movable object. It will be apparent to those skilled in the art that other types of movable objects can be used without limitation.

Figure 1:
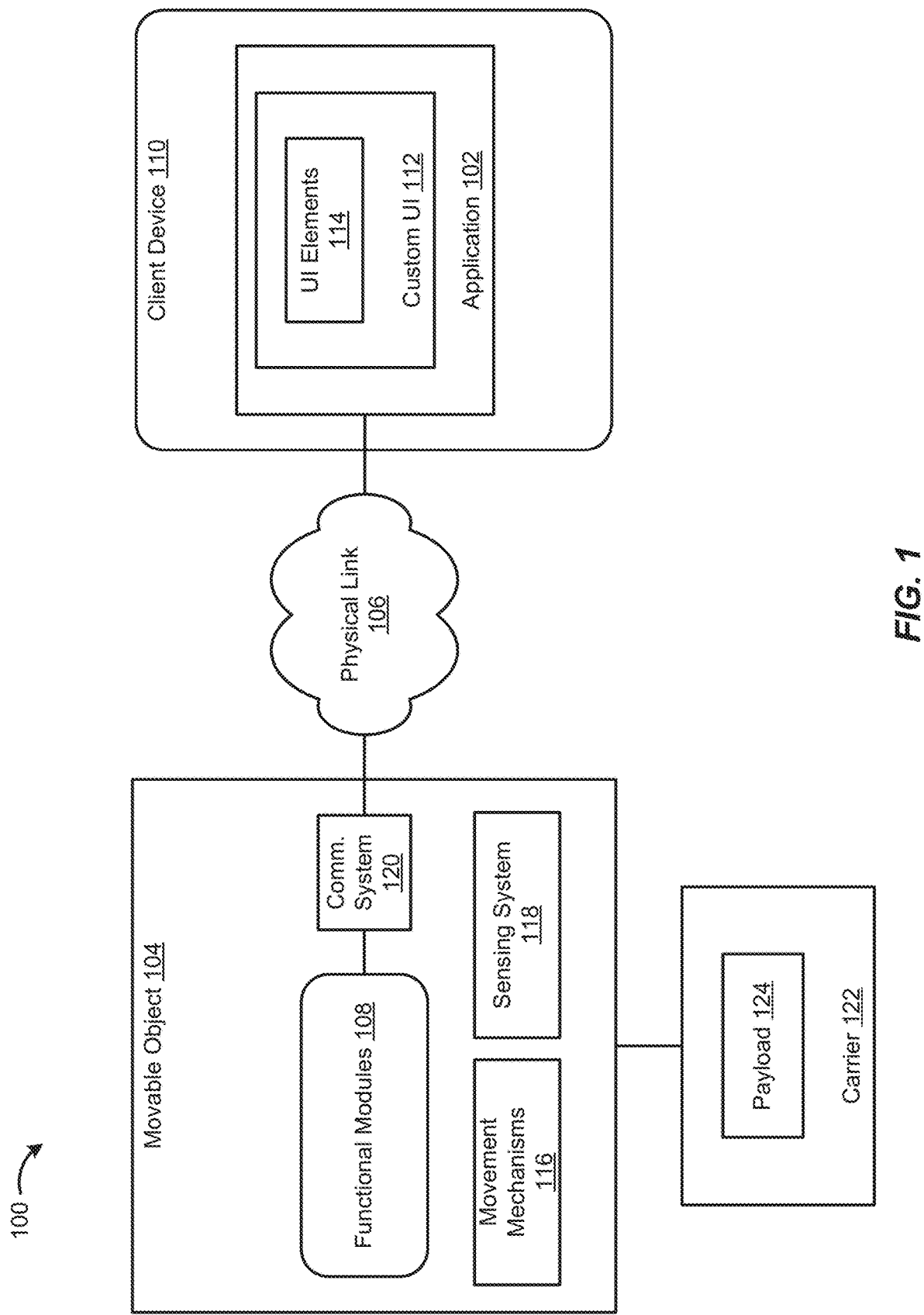
FIG. 1 illustrates an example of an application in a movable object environment, in accordance with various embodiments of the present invention.

FIG. 1 illustrates an example of an application in a movable object environment 100, in accordance with various embodiments of the present invention. As shown in FIG. 1, an application 102 in a movable object environment 100 can communicate with a movable object 104 via a physical link 106. The movable object 104 can be an unmanned aircraft, an unmanned vehicle, a handheld device, and/or a robot.

In accordance with various embodiments of the present invention, the movable object 104 can include various functional modules 108. For example, an unmanned aircraft can include a camera module, a battery module, a gimbal module a communication module, and a flight controller module, etc.

As shown in FIG. 1, the application 102 can be deployed on a client device 110. For example, the client device 110 can be a portable personal computing device, a smart phone, a remote control, and/or a personal computer. In some embodiments, application 102 can include a customized user interface (UI) 112 which includes various UI elements. As discussed further with respect to FIG. 2, a UI manager can make the various UI elements 114 available to a developer to create custom UI 112. Each UI element can provide functionality based on data received from movable object 104. For example, if a first set of data is received from a movable object, a UI element may have a first functionality and/or appearance, while if a second set of data is received from a movable object, the UI element may have a second functionality and/or appearance. The different sets of data received may correspond to different types of movable objects being connected to client device 110. These device-aware UI elements 114 allow for robust user interfaces to be developed that are interoperable with various movable objects.

Additionally, the client device 110 can include a communication device (not shown), which is responsible for handling the communication between the application 102 on the client device 110 and various modules 108 on the movable object 104. For example, an unmanned aircraft can include uplink and downlink. The uplink can be used for transmitting control signals, the down link can be used for transmitting media or video stream.

In accordance with various embodiments of the present invention, the physical link 106 can be (part of) a network, which is based on various wireless technologies, such as the WiFi, Bluetooth, 3G/4G, and other radio frequency technologies. Furthermore, the physical link 106 can be based on other computer network technologies, such as the internet technology.

In various embodiments, movable object 104 in a movable object environment 100 can include a carrier and a payload. Although the movable object 104 is described generally as an aircraft, this is not intended to be limiting, and any suitable type of movable object can be used. One of skill in the art would appreciate that any of the embodiments described herein in the context of aircraft systems can be applied to any suitable movable object (e.g., a UAV). In some instances, the payload may be provided on the movable object 104 without requiring the carrier.

In accordance with various embodiments of the present invention, the movable object 104 may include one or more movement mechanisms 116 (e.g. propulsion mechanisms), a sensing system 118, and a communication system 120. The movement mechanisms 116 can include one or more of rotors, propellers, blades, engines, motors, wheels, axles, magnets, nozzles, animals, or human beings. For example, the movable object may have one or more propulsion mechanisms. The movement mechanisms may all be of the same type. Alternatively, the movement mechanisms can be different types of movement mechanisms. The movement mechanisms 116 can be mounted on the movable object 104 (or vice-versa), using any suitable means such as a support element (e.g., a drive shaft). The movement mechanisms 116 can be mounted on any suitable portion of the movable object 104, such on the top, bottom, front, back, sides, or suitable combinations thereof.

In some embodiments, the movement mechanisms 116 can enable the movable object 104 to take off vertically from a surface or land vertically on a surface without requiring any horizontal movement of the movable object 104 (e.g., without traveling down a runway). Optionally, the movement mechanisms 116 can be operable to permit the movable object 104 to hover in the air at a specified position and/or orientation. One or more of the movement mechanisms 116 may be controlled independently of the other movement mechanisms, for example by application 102. Alternatively, the movement mechanisms 116 can be configured to be controlled simultaneously. For example, the movable object 104 can have multiple horizontally oriented rotors that can provide lift and/or thrust to the movable object. The multiple horizontally oriented rotors can be actuated to provide vertical takeoff, vertical landing, and hovering capabilities to the movable object 104. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 104 (e.g., with respect to up to three degrees of translation and up to three degrees of rotation).

The sensing system 118 can include one or more sensors that may sense the spatial disposition, velocity, and/or acceleration of the movable object 104 (e.g., with respect to various degrees of translation and various degrees of rotation). The one or more sensors can include any of the sensors, including GPS sensors, motion sensors, inertial sensors, proximity sensors, or image sensors. The sensing data provided by the sensing system 118 can be used to control the spatial disposition, velocity, and/or orientation of the movable object 104 (e.g., using a suitable processing unit and/or control module). Alternatively, the sensing system 118 can be used to provide data regarding the environment surrounding the movable object, such as weather conditions, proximity to potential obstacles, location of geographical features, location of manmade structures, and the like.

The communication system 120 enables communication with application 102 executing on client device 110 via physical link 106, which may include various wired and/or wireless technologies as discussed above. The communication system 120 may include any number of transmitters, receivers, and/or transceivers suitable for wireless communication. The communication may be one-way communication, such that data can be transmitted in only one direction. For example, one-way communication may involve only the movable object 104 transmitting data to the application 102, or vice-versa. The data may be transmitted from one or more transmitters of the communication system 110 to one or more receivers of the client device, or vice-versa. Alternatively, the communication may be two-way communication, such that data can be transmitted in both directions between the movable object 104 and the client device 102. The two-way communication can involve transmitting data from one or more transmitters of the communication system 120 to one or more receivers of the client device 110, and vice-versa.

In some embodiments, the application 102 can provide control data to one or more of the movable object 104, carrier 122, and payload 124 and receive information from one or more of the movable object 104, carrier 122, and payload 124 (e.g., position and/or motion information of the movable object, carrier or payload; data sensed by the payload such as image data captured by a payload camera; and data generated from image data captured by the payload camera). In some instances, control data from the application may include instructions for relative positions, movements, actuations, or controls of the movable object, carrier, and/or payload. For example, the control data may result in a modification of the location and/or orientation of the movable object (e.g., via control of the movement mechanisms 116), or a movement of the payload with respect to the movable object (e.g., via control of the carrier 122). The control data from the application may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). Although embodiments may be described that include a camera or other image capture device as payload, any payload may be used with embodiments of the present invention. In some embodiments, application 102 may be configured to control a particular payload.

In some instances, the communications from the movable object, carrier and/or payload may include information from one or more sensors (e.g., of the sensing system 118 or of the payload 124) and/or data generated based on the sensing information. The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier, and/or payload. Such information from a payload may include data captured by the payload or a sensed state of the payload.

Figure 2:
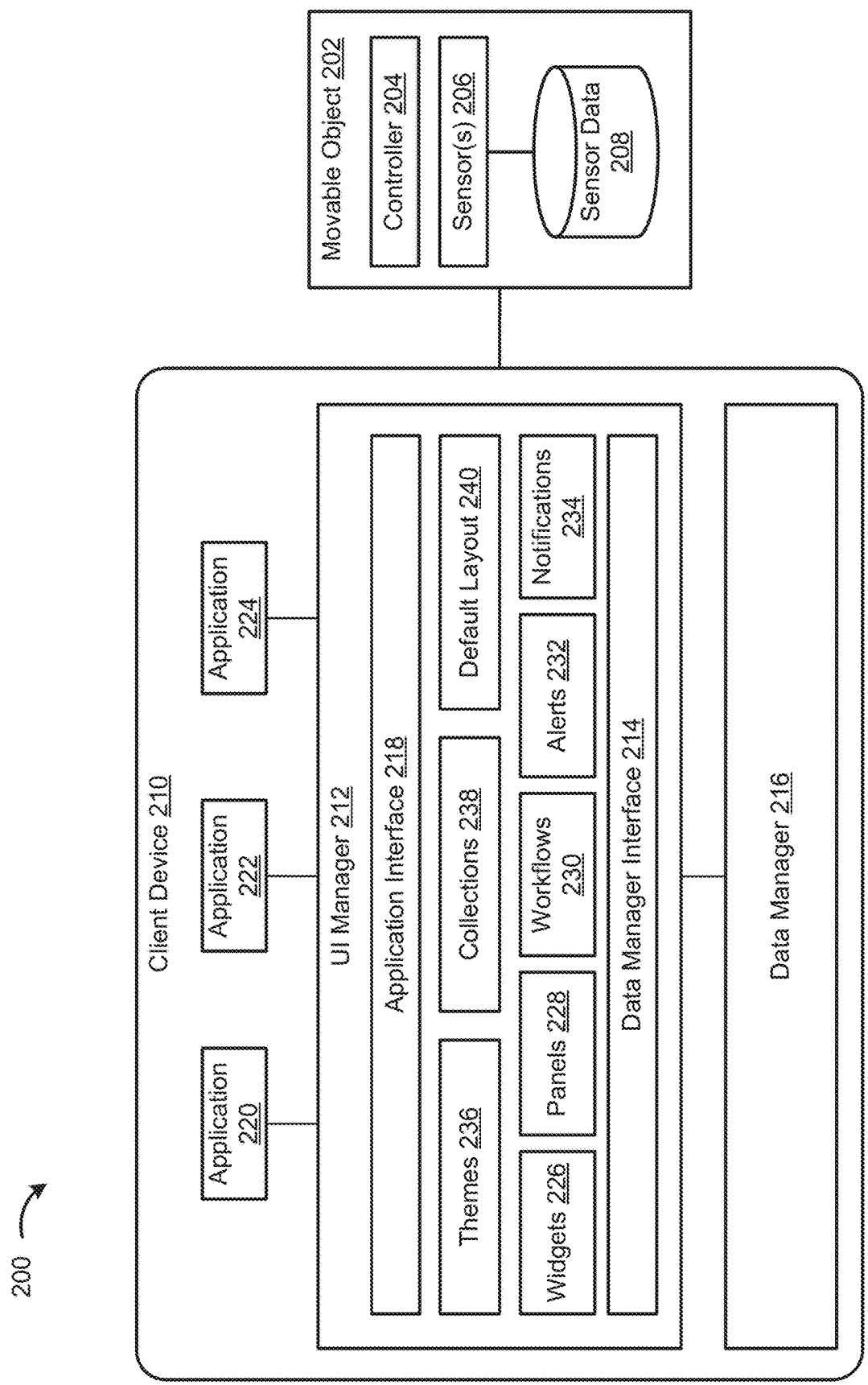
FIG. 2 illustrates an example of a user interface manager and a data manager in a movable object environment, in accordance with various embodiments of the present invention.

FIG. 2 illustrates an example of a user interface manager and a data manager in a movable object environment 200, in accordance with various embodiments of the present invention. A movable object 202 can include an unmanned aircraft, an unmanned vehicle, a handheld device, and/or a robot. Movable object 202 can include a controller 204, such as a flight controller, that can control the navigation of the movable object and limit the movement of the movable object based on geo-fencing data (e.g., access data) received from an access manager through a location manager. Movable object 202 may also include one or more sensors 206, which may produce sensor data 208. As noted above, the one or more sensors 206 can include any sensors, including GPS sensors, motion sensors, inertial sensors, proximity sensors, or image sensors. The sensor data 208 can be used to control the spatial disposition, velocity, and/or orientation of the movable object 202. In some embodiments, sensors 206 may collect state information about the movable object 202, such as battery level, signal strength (e.g., remote control signal strength, video signal strength, GPS signal strength, etc.), and other information. Additionally, or alternatively, sensors 206 can collect data regarding the environment surrounding the movable object 202, such as weather conditions, proximity to potential obstacles, location of geographical features, location of manmade structures, and the like.

Movable object 202 can receive instructions from, and provide sensor data to, client device 210. Client device 210 can include a desktop or laptop computer, tablet computer, smartphone, or other mobile device, wearable computer, virtual reality system, or other client device. Client device 210 can include a user interface (UI) manager 212. Although the embodiment shown in FIG. 2 shows UI manager 212 deployed to client device 210, in some embodiments, UI manager 212 can be deployed to one or more servers and manage UI services for multiple client devices remotely. In some embodiments UI manager 212 can be part of a software development kit (SDK), or mobile SDK, which is used for supporting the development of software applications in the movable object environment 200. UI manager 212 can include several interfaces to communicate with other systems in the movable object environment. For example, data manager interface 214 can facilitate communication with a data manager 216, and application interface 218 can enable various applications 220, 222, 224, to utilize UI elements and services provided by UI manager 212. Although three applications are shown, embodiments may support more or fewer applications. In some embodiments, applications 220, 222, 224 can each be developed by the same or different application developers and can each be configured by its developer to provide a user interface for operating and/or communicating with the movable object 202 using the UI manager 212. Developers may include internal developers, third party developers, end users, etc.

As discussed above, customized user interfaces can be created by developers to use movable objects in various domain specific applications. However, many UI features are shared across these user interfaces, such as a video view showing a first-person view (FPV), photography and videography controls, heading, telemetry, movable object status, etc. In various embodiments, UI manager 212 provides a base library of UI elements that can be used to develop custom user interfaces for various applications 220, 222, 224. This enables the rapid prototyping of usable apps to show that a movable object is suitable for particular domain specific tasks or applications by abstracting away most of the UI development required to create the apps.

As shown in FIG. 2, UI manager 212 can include various movable object-aware UI elements, including widgets 226, panels 228, collections 238, and workflows 230. Widgets 226 may include small UI elements which provide information (e.g., height, compass, battery, range, video signal strength, remote control signal strength, telemetry data, pitch and roll, etc.) or may be selected to perform a function (e.g., return to home, takeoff, capture a photograph, capture video, etc.). As discussed further below, widgets may be customized in appearance and/or function. Panels 228 may include pre-grouped UI elements, such as various camera settings. In some embodiments, panels may be customized in appearance, however as panels may be associated with particular hardware (e.g., cameras) having specific functionality, the functionality of the panels may be less customizable than widgets. Workflows 230 can provide instructions (e.g., a series of images demonstrating usage of the movable object) for the user to perform with the movable object. For example, a compass calibration process may be associated with a workflow that demonstrates how the user is to orient the movable object to complete calibration. Similar to panels, workflow appearance may be customized, but functionality or content may be relatively less customizable than widgets as the workflows are tied to particular actions to be performed. As discussed further herein, the various types of UI elements (e.g., widgets, panels and collections, workflows, etc.) may be customized in various ways. For example, widgets may be customized individually, or as a collection or panel. These customizations may include the look of the widgets or other UI elements and/or the functionality of the elements. In some embodiments, this may include changing color schemes to match a custom UI theme, adding or modifying animations associated with how the UI elements display data, or other customizations.

In some embodiments, a graphical user interface (GUI) can be constructed in a development environment by dragging and dropping UI elements into the development environment at desired locations. In some embodiments, widgets can be located at arbitrary locations within the UI. For example, a testing UI that is meant to cause the movable object to perform certain actions while monitoring battery life may include a highly visible battery widget located centrally in the UI and several customized widgets corresponding to each action to be performed. A UI element placed in a title bar, where space is limited, may be associated with a first appearance; while the same UI element placed in a side bar, where space is more available, may be associated with a second appearance. For example, a battery widget that indicates available battery power in the title bar may be drawn horizontally and indicate a percentage available. However, the same battery widget in the side bar may be drawn vertically and display available power in each battery cell. As such, each UI element can automatically be rendered based on the available space where it is located. The available space may be defined by a view, or other UI element, depending on the platform and development environment in use.

In various embodiments, UI elements can be customized by the developer. For example, the developer can customize the size of a UI element or have the size of the UI element vary dynamically. For example, widgets can be resized for improved usability. For example, a search and rescue app may hide camera features while featuring large widgets that can be selected by a user wearing gloves. Additionally, the appearance and/or functionality of the UI element can be modified by the developer. Each element may have an associated transform and update. The transform can determine how raw data received by the widget is used by the widget, and the update can determine how the widget is displayed based on how the data is used by the widget. For example, a battery widget may receive data from the movable object through data manager 216 indicating a battery level. The battery widget transform can convert that battery level to a percentage and change the display of the battery accordingly. For example, a 77% battery level may cause the battery widget to display 3 bars. The transform can also define how the display changes, for example, at 74% the widget can continue to show 3 bars or may drop to 2 bars, depending on the defined transform. The associated battery widget update may define changes to how the widget is rendered, for example an animated view as the battery level drops or change in color.

In various embodiments, a widget or other UI element may be customized by overriding associated transform and update classes, or other data structures. For example, a new custom transform class inheriting the base transform class can be written to modify the appearance of a widget and/or a corresponding action for the widget. Similarly, a new custom update class inheriting the base update class can be written to modify how the widget is rendered in the GUI.

In various embodiments, alerts 232 can be provided when a selected action is unavailable. For example, if a user selects a takeoff widget, but no movable object is connected, a "not connected" alert can be displayed. Notifications 234 can be provided as the movable object performs instructed tasks, such as approaching a target area, returning home, landing, etc.

In various embodiments, themes 236 can be used to apply colors, designs, and/or other visual elements to each UI element. For example, a customized GUI may be designed by a developer to be incorporated into another app that has a particular color theme or branding. Themes 236 enable the appearance of all or a portion of UI elements to be consistently customized. In some embodiments, collections 238 can define groupings of widgets. For example, a compass widget, range widgets, and speed widgets may be combined into a dashboard collection. Collections 238 can be customized by the user like any other widget, in appearance and/or function, and may also be customized by adding various widgets to the collection.

In some embodiments, data manager 216 is movable object-aware such that it knows the type of movable object to which it is connected. Data manager may then make available data from the connected movable object. Data manager interface 214 receives the data provided by data manager 216 and makes the data available to registered UI elements. Although the data manager interface 214 may not be movable object-aware, the types and amount of data available from the data manager 216 may be correlated to the type of movable object. Each UI element can be configured to provide different appearance and/or functionality depending on the type and amount of data available from data manager interface 214. This enables the UI elements to provide movable object-specific functionality, without being movable object-aware. UI elements may register with data manager interface 214 to receive data from data manager 216. For example, a battery widget may register to receive battery data, a camera panel may register to receive camera data, etc. Once registered, data manager interface 214 may listen for data from data manager 216. When data for a registered UI element is received, data manager interface 214 can send the data to the registered UI element.

In some embodiments, sensor data received may be received by data manager 216 and repackaged before being provided to data manager interface 214. For example, data manager 216 may be configured to communicate with various movable objects, and accordingly with various sensors. Each sensor may provide sensor data in different formats. Data manager 216 may convert the sensor data into a common format that can be consumed by the data manager interface 214 and the various UI elements, prior to providing the data manager interface. As such, in some embodiments, the raw sensor data may not be provided to the data manager interface from the data manager, but instead data corresponding to that raw sensor data (e.g., reformatted or repackaged data) may be provided. In various embodiments, the data manager 216 may receive sensor data from the movable object 202 independently of any request for data from the data manager interface 214 or any particular user interface element. For example, after a widget registers for data with the data manager, the data manager may provide data asynchronously, as it becomes available, without first requiring a request for data from the widget.

In various embodiments, UI elements can provide different appearance and/or functionality depending on the data received from the connected movable object. For example, a camera panel may render different pages depending on the camera of the connected movable device. A more advanced camera with more configurable settings may show additional pages of widgets specific to these settings, while if a less configurable camera is connected, the camera panel may show fewer pages corresponding to less functionality provided. This device awareness simplifies the development process by eliminating the need for the developer to either account for each possible device that may be connected to the application or for the developer to define specific UI features for different devices.

In accordance with an embodiment, data manager interface 214 can manage widget lifecycle, maintain movable object state, manage widget data registration, and/or determine when movable object and/or components are available. This enables UI elements to be independent of the data manager 216. Additionally, by registering for data with the data manager interface 214, data can be provided when it becomes available, even if the corresponding data sources are not available at registration time from data manager 216 (e.g., if the movable object is not yet connected). At registration, the UI element can indicate to the data manager interface what data is expected. For example, a battery widget may register for battery data. Similarly, a dashboard collection may register for data corresponding to each constituent widget of the dashboard as well as collection-specific data. For example, the dashboard may change how it is displayed when the movable object is in different modes. When the movable object is on its way to a target destination, a range to target widget may be prominently displayed in the dashboard. The dashboard may also be registered to receive data when the movable object enters a return to home state. The dashboard may then change to a display a range to home widget more prominently (e.g., in the center of the dashboard).

In various embodiments, one or more default layouts 240 may be provided. A default layout may be associated with a set of UI elements in a predefined layout and theme. A default layout may serve as a base UI which can be modified by the developer as needed.

Although embodiments are discussed herein with respect to a movable object, such as an unmanned aerial vehicle, this is for simplicity of explanation. Embodiments may be used to provide various elements and services to various devices.

In some embodiments, custom workflows can be created. For example, mission workflows can be implemented to instruct a user to select and location, instruct the movable object to perform a function at that location, and return.

In some embodiments, UI profiles may be created for individual users. When a user logs in to a client device, the client device may identify a UI profile associated with that user and render the UI accordingly. For example, a user with a power user profile (a power user) may be shown a first set of UI elements (e.g., a large number of widgets, panels, workflows, etc. corresponding to a detailed view of the operation of the movable object, camera, or other feature, service, or device) while a user with a novice user profile (a novice user) may see a second set of UI elements (e.g., a limited number of widgets corresponding to more simple tasks). The number of UI library components and level of complexity and/or customization of the components that are available to the users may vary depending on their user UI profiles. For example, a power user may be shown a cell by cell breakdown of each battery on a movable object in a battery widget, while the novice user may see a battery percentage and an alert when the battery gets low.

Figure 3:
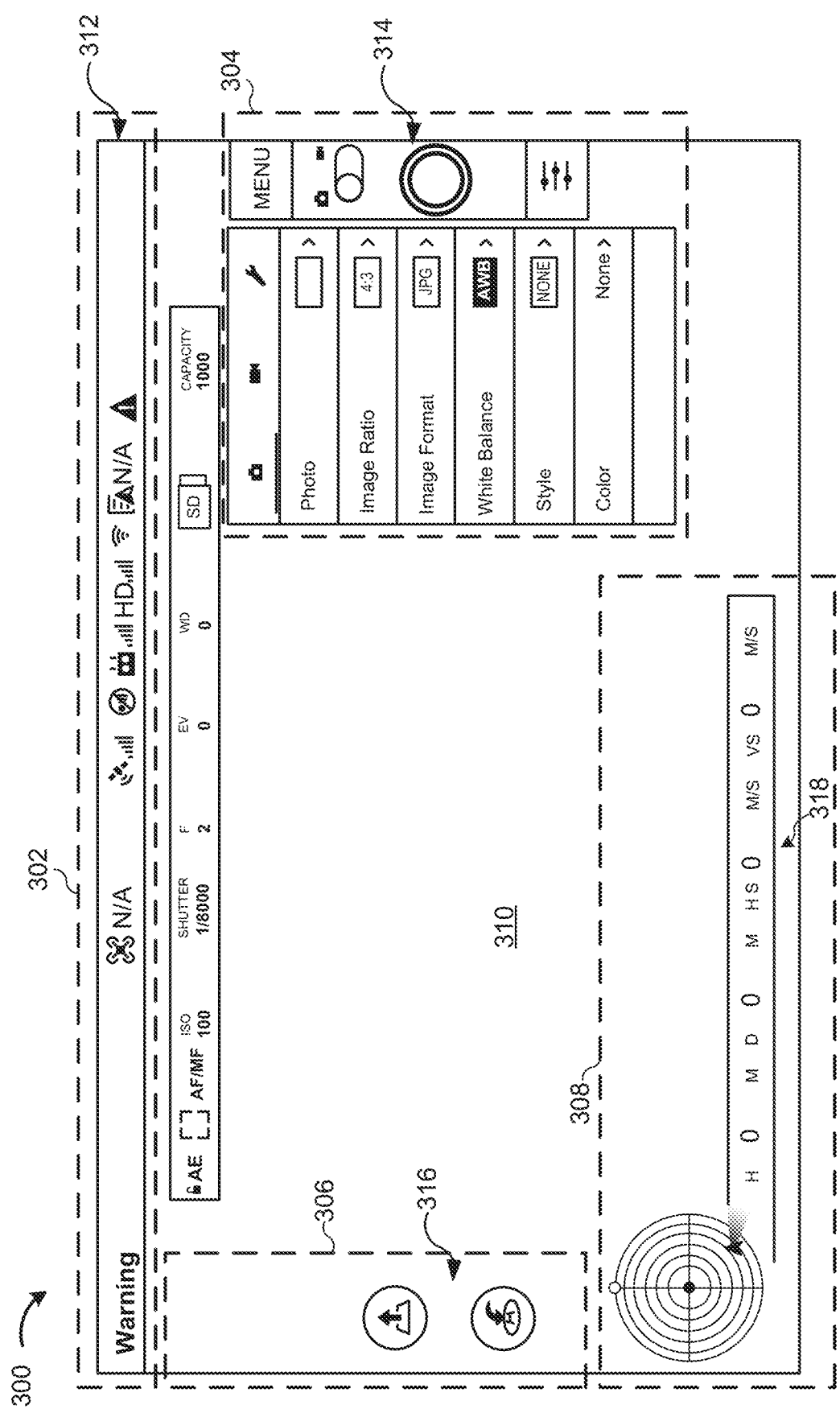
FIG. 3 illustrates an example user interface, in accordance with various embodiments of the present invention.

FIG. 3 illustrates an example user interface 300, in accordance with various embodiments of the present invention. As shown in FIG. 3, a custom user interface can include a status bar 302, side bars 304 and 306, and dock 308. In some embodiments, UI 300 can include a content area 310, which may include a first person view as shown (e.g., a streamed video view), a map view showing an area over which the movable object may travel, or other content. Status bar 302 can include various widgets 312 such as signal strength widgets, battery widgets, etc. Side bar 304 can include a panel, such as camera panel 314 including a control portion including a take picture button, and a menu portion including various photo and video settings. Side bar 306 can include additional widgets 316, such as another battery widget and takeoff widget. Dock 308 can include a collection of widgets, such as dashboard 318 showing speed, range and other widgets. As discussed, the positions, appearance, and functions of the widgets and collections of widgets can be modified by a developer and may include more or fewer widgets, panels, or other UI elements as described herein.

Figure 4:
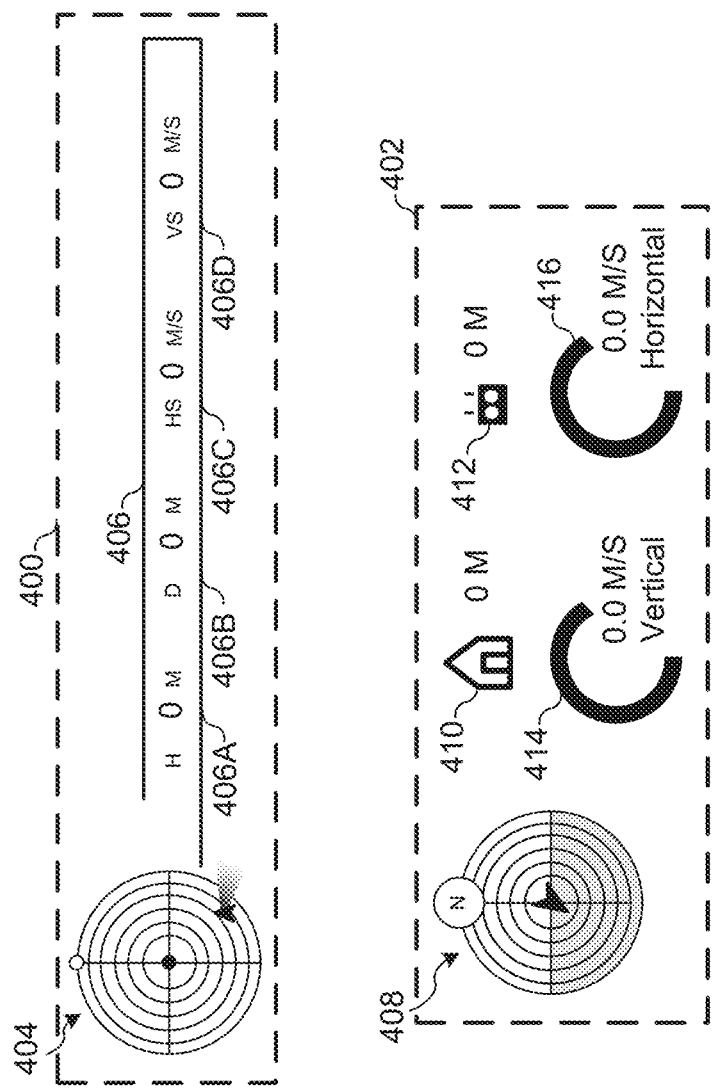
FIG. 4 shows examples of collections, in accordance with an embodiment.

FIG. 4 shows examples of collections, in accordance with an embodiment. In the example of FIG. 4, two collections 400 and 402 are shown. Each collection may include an arbitrary number of widgets which may be grouped according to designer preferences (e.g., a collection does not require any shared functionality or use among the included widgets). Collection 400 includes a position widget 404 which shows the movable object's location, heading, and camera view direction relative to a central point, such as a home location. As the movable object moves in space or orientation, the widget receives updated position and/or orientation data from the data manager. This data may then be used to update the visualization of widget 404 based on the widget's associated transform. Collection 400 may also include a position/speed widget 406 which depicts numerically the movable objects distance from home 406A and distance to destination 406B, as well as the movable object's horizontal 406C and vertical speeds 406D. In some embodiments, widget 406 may itself be a collection of widgets 406A-D.

Collection 402 includes a different set of widgets 408-416. For example, a compass widget 408 may show the current heading of the movable object relative to cardinal directions. Collection 402 may also include a distance from home widget 410 and distance from remote control widget 412. Collection 402 may also include widgets depicting the vertical speed 414 and horizontal speed 416 of the movable object, both numerically and graphically (e.g., the speed may be depicted radially along the shown arcs). As discussed, a widget may be depicted differently, depending on various factors, such as available screen space, data received from the movable object, user profile, etc. In the example of FIG. 4, widgets 410, 414, and 416 may be the same widgets as widgets 406A, 406C, and 406D. However, because collection 402 occupies more vertical screen space than collection 400, the widgets may automatically be rendered larger to fill the screen space and show additional details, such as the speed arcs. Additionally, or alternatively, a user profile associated with the current user of application which includes these collections may determine how the collections are rendered. For example, an expert user profile may show collection 400 and show simplified visualizations of the widgets, while a casual user profile may show collection 402 and receive greater visualizations of the widgets.

FIGS. 5A-5C illustrate examples of widget configurability in a user interface, in accordance with various embodiments of the present invention. As discussed above, a custom UI 500 may be constructed using various UI elements which can be fully configurable, in appearance and functionality (e.g., based on the data received from the movable object). As shown in FIGS. 5A-5C, a given widget, such as battery widget 502, may communicate with data manager 504. As discussed above, data manager 504 manages communication with a connected movable object. The data manager 504 can provide a layer of abstraction to the movable objects, enabling widget development to be simplified. For example, rather than developing a widget to communicate with each different type of movable object, the widget can be developed to communicate with the data manager. The data manager may then request data from the connected movable object independently, to request and receive data from the movable object, ensure connection to the movable object, etc. As shown in FIG. 5A, when data manager 504 is connected to movable object A 506, a first set of battery data may be received by data manager 504. Battery widget 502 may receive data from the movable object 506 through data manager 504 indicating a battery level. The battery widget transform can convert that battery level to a percentage and change the display of the battery 503a accordingly. For example, the displayed percentage and/or the number of bars shown in rendering 503a may be modified based on the received battery level.

In some embodiments, the rendering of the battery widget 502 may vary depending on the type of connected movable object and/or the user interface in which the battery widget is displayed. For example, as shown in FIG. 5B, UI 508 may include battery widget 502 in a different position, such as along a side bar (e.g., such as side bar 306) or other portion of the UI where the widget may occupy a larger displayable area. In such an embodiment, an enlarged UI element 503*b* may be displayed, where a continuous, or substantially continuous, level bar is shown. The battery widget transform can update the level bar as additional battery data is received by the battery widget from the data manager.

In some embodiments, as shown in FIG. 5C, when the data manager 504 is connected to a different movable object, such as movable object B 510, a second set of battery data may be received by the data manager 504, as compared to the battery data received from movable object A 506. For example, movable object B 510 may include a larger battery, or a different battery controller, which may output battery level data for each cell. When battery widget 502 receives the battery cell data from each cell, a different rendering 503*c* of the batter UI element may be displayed in UI 500. As shown, the UI element may include a bar for each cell. Each bar may be displayed based on the battery widget transform, and the display may be updated as new battery data is received. In various embodiments, data manager 504 may manage requests for updated battery data from the connected movable object without additional requests from battery widget 502.

Figure 6:
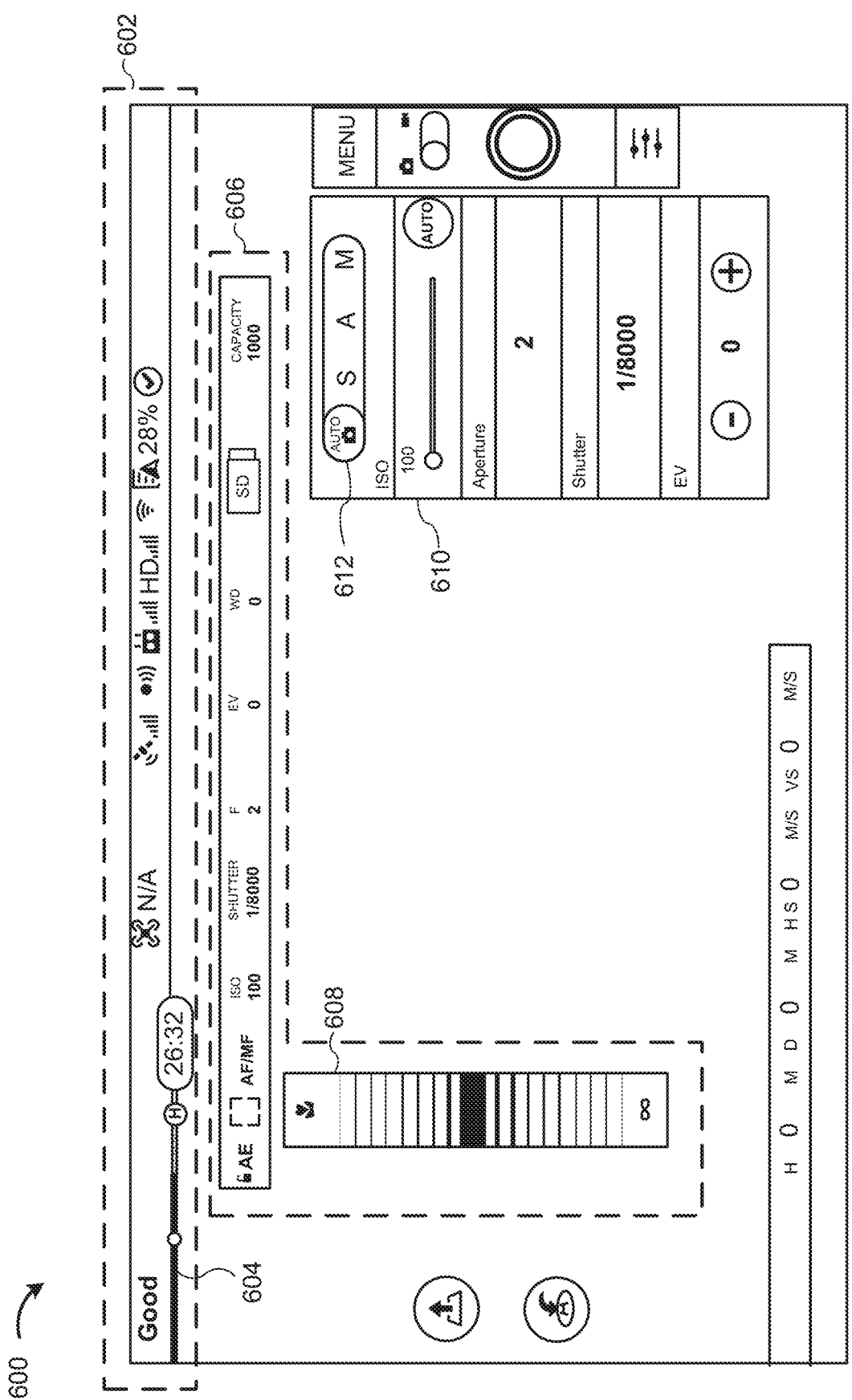
FIG. 6 illustrates another example user interface, in accordance with various embodiments of the present invention.

FIG. 6 illustrates another example user interface, in accordance with various embodiments of the present invention. As shown in FIG. 6, a custom user interface 600 can include a status bar 602, as well as side bars and a dock, similar to that shown in FIG. 3. In the example of FIG. 6, the status bar includes additional status information, reflecting that the user interface is connected to a different movable object, or that the movable object is in a different state or mode. For example, status bar 602 includes a flight status or mission status widget 604 indicating a current mission time, waypoints, and a completion bar indicating how much of the mission is complete. In some embodiments, the mission status widget 604 may use location data and time data received from the movable object through the data manager to determine how much of the mission has been completed. For example, a mission status transform may use distance traveled versus total expected mission distance to determine a percentage of the completed mission. In some embodiments, UI 600 can include a camera settings panel 606 which may include widgets to display current camera settings, such as ISO, shutter, etc. In some embodiments, camera settings panel 606 may also enable settings to be adjusted in addition to those available through camera panel 610. For example, focus settings may be viewed and/or adjusted through focus widget 608. Similar to FIG. 3, the side bar can include a camera panel 610 including a control portion including a take picture button, and a menu portion including various photo and video settings. Unlike FIG. 3, the connected movable object includes a camera capable of operating in multiple modes 612. For example, as shown, an automatic mode allows for camera settings to be selected by automatically, based on current conditions such as lighting, movable object motion, etc. The camera panel 610 may receive camera data from the data manager indicating that the connected movable object includes a camera supporting multiple modes, and may automatically render panel 610 rather than panel 314. This speeds development of user interface 600 by eliminating the need to account for the capabilities of each movable object that may be connected to the data manager. Instead, by being device aware, a panel that supports the capabilities of the connected movable object can be displayed in the user interface, without requiring additional development time or resources. As discussed, the positions, appearance, and functions of the widgets and collections of widgets can be modified by a developer and may include more or fewer widgets, panels, or other UI elements as described herein.

Figure 7A:
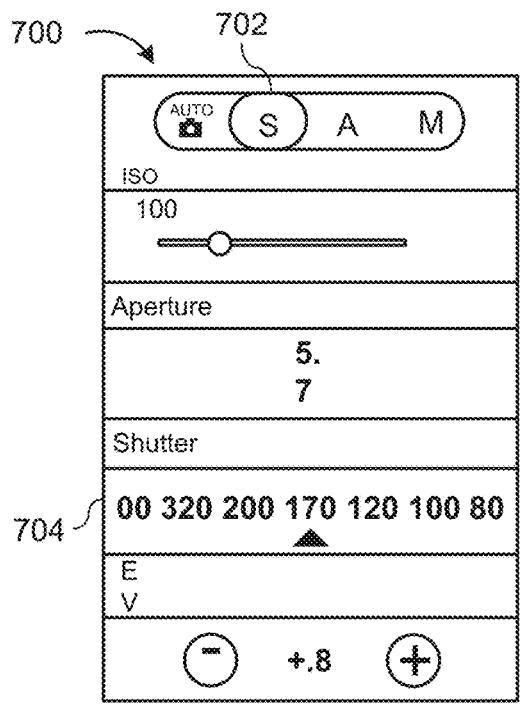
FIGS. 7A and 7B illustrate examples of panels in a user interface, in accordance with various embodiments of the present invention.
Figure 7B:
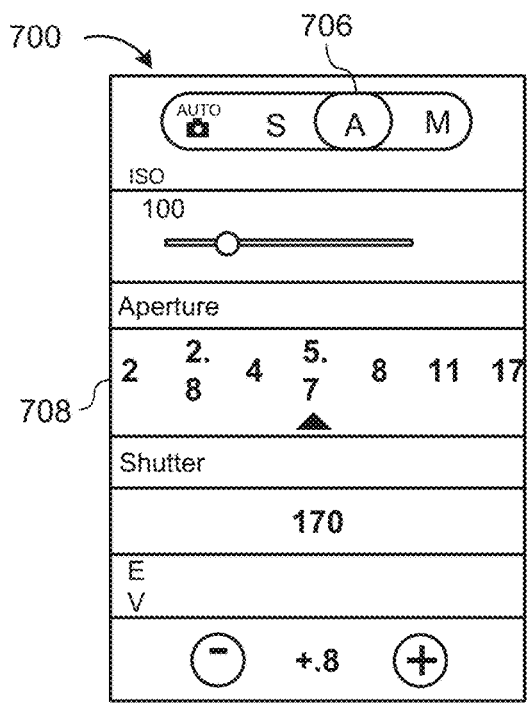

FIGS. 7A and 7B illustrate examples of panels in a user interface, in accordance with various embodiments of the present invention. As shown in FIGS. 7A and 7B, panel 700 may show additional functionality of panel 508, discussed above. For example, where the camera included in the movable object is capable of a shutter priority mode, the mode may be selected at 702. This may change panel 700 to include enable additional user customization, such as selecting shutter settings 704. Similarly, if the camera included in the movable object is capable of an aperture priority mode, this mode may be selected at 706 and may cause the panel 700 to enable customization of aperture settings 708. In either mode, the panel may receive input from the user (e.g., shutter or aperture settings) through the user interface, and pass those inputs to the data manager. The data manager may then provide corresponding instructions to the connected movable object, without requiring the panel itself to be capable of direct interaction with the hardware of the movable object. If the camera is not capable of these modes, or if the user is prevented from accessing this functionality, then the mode selection elements 702 and 706 may be hidden or made non-selectable, leaving the panel with the default settings shown in panel 608.

Figure 8:
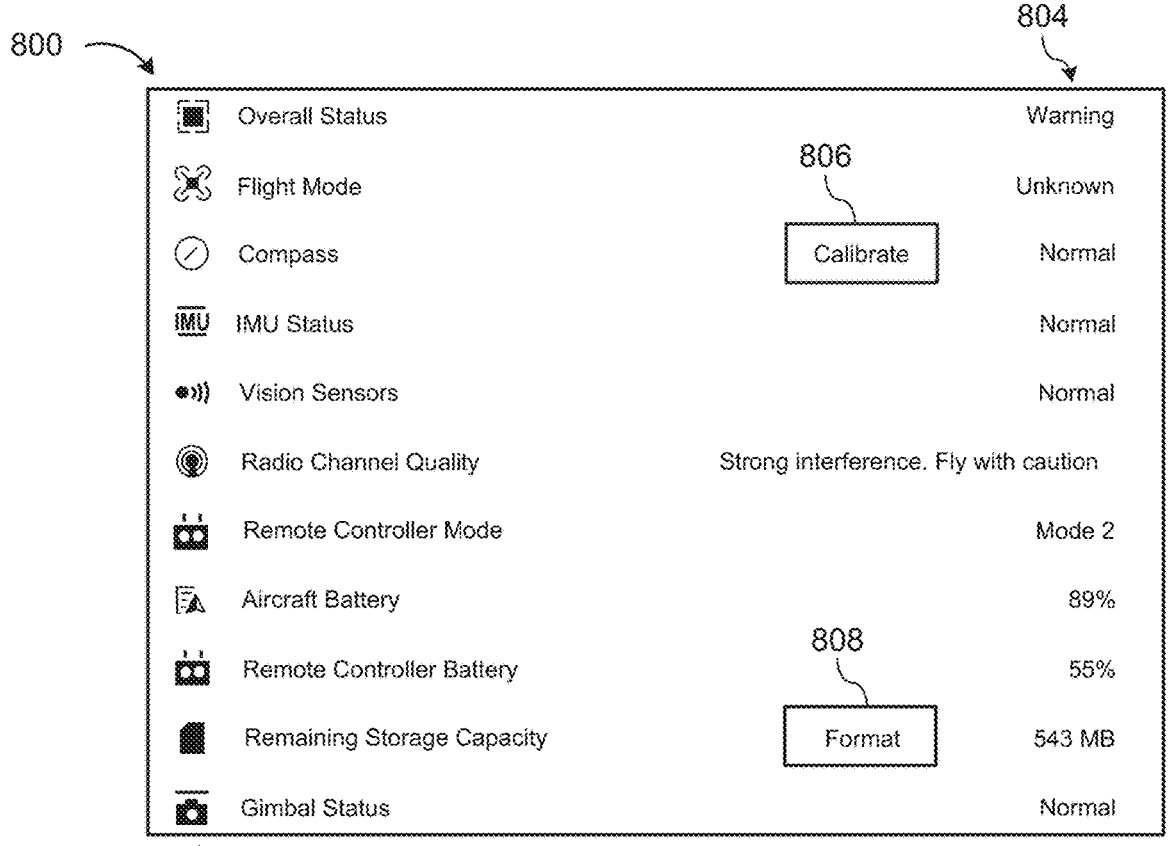
FIG. 8 illustrates an example of a panel in a user interface, in accordance with various embodiments of the present invention.

FIG. 8 illustrates an example of a panel in a user interface, in accordance with various embodiments of the present invention. As shown in FIG. 8, panel 800 may include pre-grouped UI elements, such as status information for various movable object systems 802. In some embodiments, panel 800 may include widgets for more or fewer movable object systems depending on the particular type of connected movable object. Status information 804 for each widget may be obtained by the panel from the data manager. As discussed, the data manager may obtain data from the corresponding movable object systems before repackaging the data and passing it to the panel. Updates and transforms associated with each widget and/or with the panel 800 may then determine how that data is rendered. As shown, panel 800 may further include selectable UI elements 806 and 808 which may activate corresponding workflows when selected. As discussed, workflows can provide instructions (e.g., a series of images demonstrating usage of the movable object) for the user to perform with the movable object. For example, by selecting calibration element 806, a sensor (e.g., compass) calibration workflow may be displayed which indicates how the user is to orient the movable object to complete calibration. Similarly, by selecting format element 808, a format workflow may walk a user through a series of warnings or backup options prior to formatting the storage media in use. As discussed, these workflows may be customized as to their appearance, while changes to the specific functionality or steps included in the workflow may be more restricted.

Figure 9:
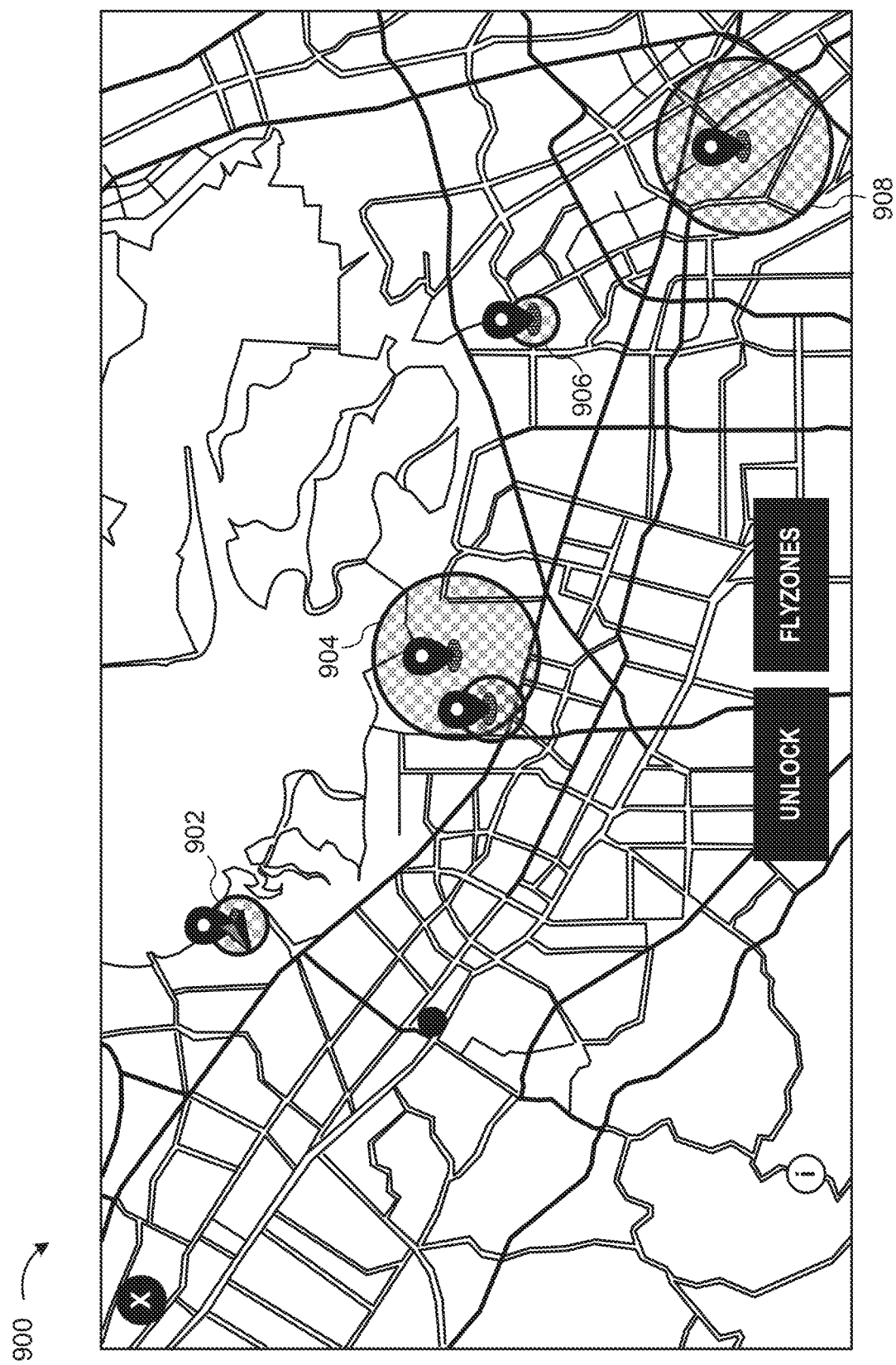
FIG. 9 illustrates an example of a map widget in a user interface, in accordance with various embodiments of the present invention.

As described above, a user interface content area can include streaming video or image data captured by the movable object. Additionally, the content area can display a map widget and/or a path tracking widget. FIG. 9 illustrates an example of a map widget in a user interface, in accordance with various embodiments of the present invention. As shown in FIG. 9, a map widget 900 may indicate a real-time location 902 of the connected movable object. In various embodiments, the real-time location may be obtained by the map widget from a data manager which requests location data from the connected movable object (e.g., from a location sensor onboard the movable object, such as a Global Positioning System, Real Time Kinematic Satellite Navigation, or BeiDou Navigation Satellite System module). As discussed above, the map widget may obtain location data without being programmed for the specific type of location sensor used by the connected movable object. Instead, the data manager obtains the location data from the specific type of location sensor included in the connected movable object and can repackage the location data to be consumed by the map widget. The map widget update and transform can determine how the location of the movable object is animated in the map widget as the movable object moves. In some embodiments, the map widget 900 may include additional elements, such as representations of no-fly zones 904, 906, 908.

Figure 10:
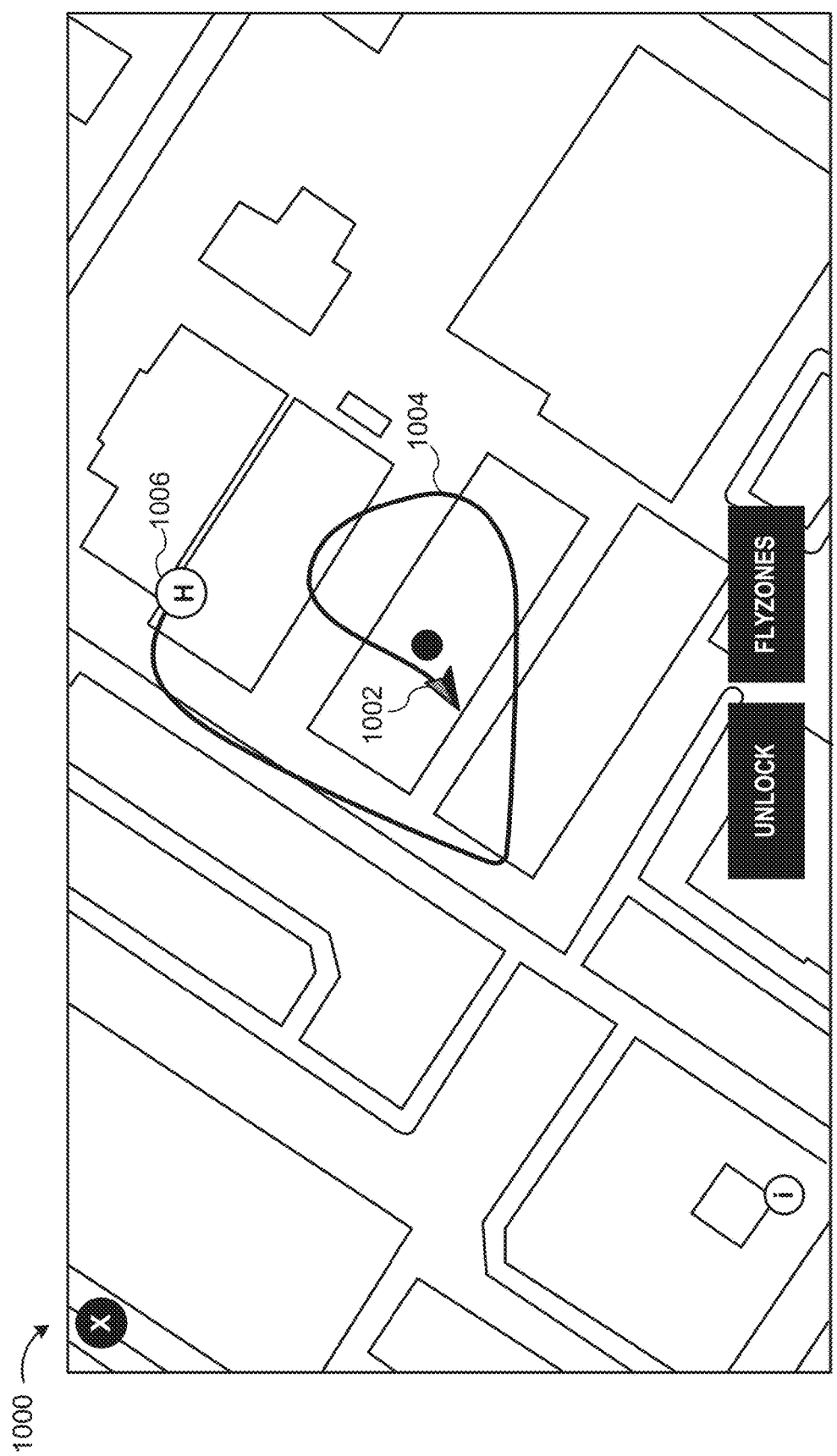
FIG. 10 illustrates an example of a path tracking widget in a user interface, in accordance with various embodiments of the present invention.

FIG. 10 illustrates an example of a path tracking widget in a user interface, in accordance with various embodiments of the present invention. As shown in FIG. 10, a path tracking widget 1000 may be incorporated into a content area of a user interface (e.g., such as content area 310). The path tracking widget can include an element 1002 representing the current location of the movable object. As in the map widget, the path tracking widget may obtain the current location from the movable object via a data manager. As the movable object moves in real space, the past locations can be represented by path 1004. In some embodiments, the path tracking widget may be associated with a cache or temporary memory in which past locations may be stored and used for rendering the path tracking widget. Additionally, in some embodiments, the path tracking widget may include elements indicating other proximate locations, such as element 1006 representing the "home" or starting location of the movable object.

Figure 11:
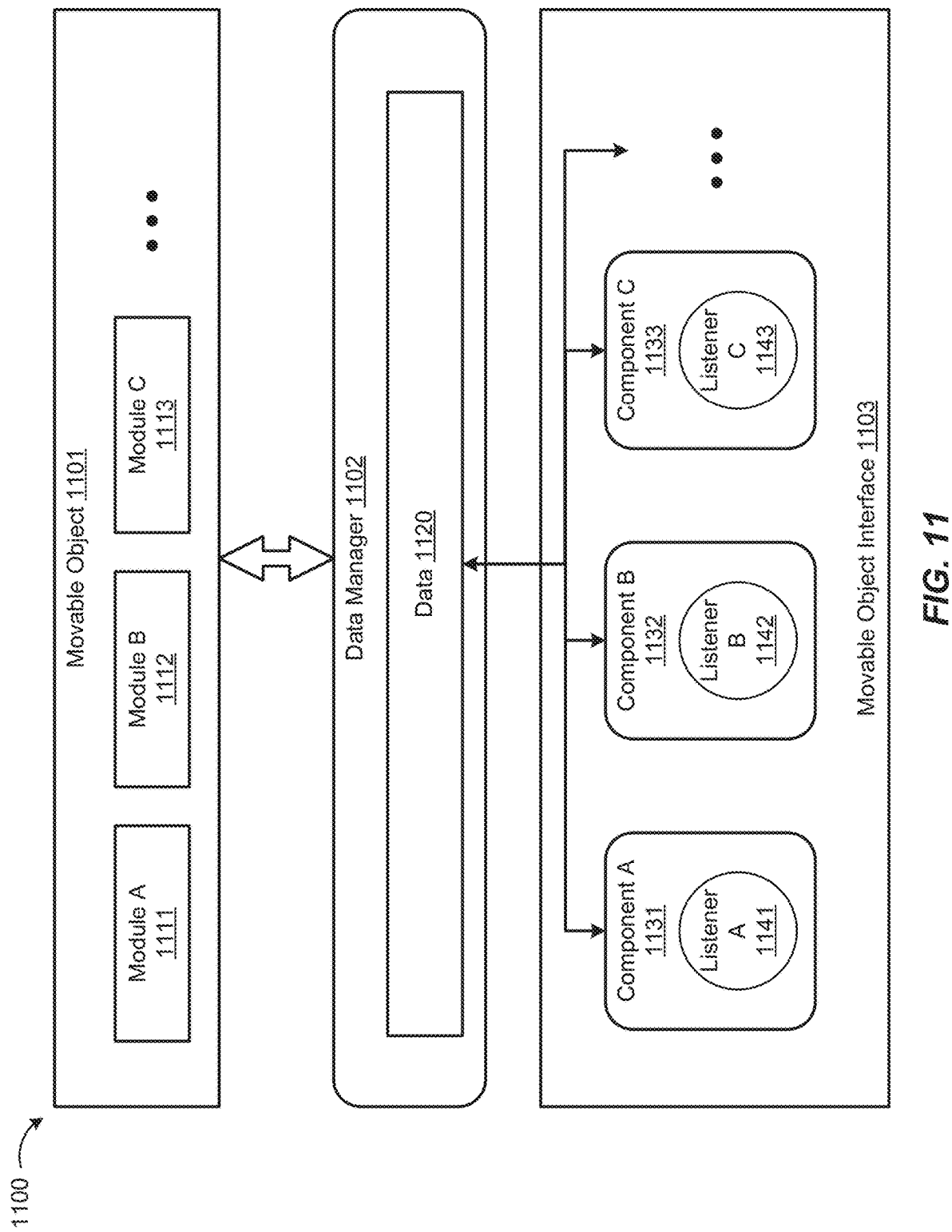
FIG. 11 illustrates an example of supporting a movable object interface in a software development environment, in accordance with various embodiments of the present invention.

FIG. 11 illustrates an example of supporting a movable object interface in a software development environment, in accordance with various embodiments of the present invention. As shown in FIG. 11, a movable object interface 1103 can be used for providing access to a movable object 1101 in a software development environment 1100, such as a software development kit (SDK) environment. As discussed above, the user interface manager can be provided as part of an SDK or mobile SDK to enable applications to include customized user interfaces.

Furthermore, the movable object 1101 can include various functional modules A-C 1111-1113, and the movable object interface 1103 can include different interfacing components A-C 1131-1133. Each said interfacing component A-C 1131-1133 in the movable object interface 1103 can represent a module A-C 1111-1113 in the movable object 1101.

In accordance with various embodiments of the present invention, the movable object interface 1103 can provide one or more callback functions for supporting a distributed computing model between the application and movable object 1101.

The callback functions can be used by an application for confirming whether the movable object 1101 has received the commands. Also, the callback functions can be used by an application for receiving the execution results. Thus, the application and the movable object 1101 can interact even though they are separated in space and in logic.

As shown in FIG. 11, the interfacing components A-C 1131-1133 can be associated with the listeners A-C 1141-1143. A listener A-C 1141-1143 can inform an interfacing component A-C 1131-1133 to use a corresponding callback function to receive information from the related module(s).

Additionally, a data manager 1102, which prepares data 1120 for the movable object interface 1103, can decouple and package the related functionalities of the movable object 1101. Also, the data manager 1102 can be used for managing the data exchange between the applications and the movable object 1101. Thus, the application developer does not need to be involved in the complex data exchanging process.

For example, the SDK can provide a series of callback functions for communicating instance messages and for receiving the execution results from an unmanned aircraft. The SDK can configure the life cycle for the callback functions in order to make sure that the information interchange is stable and completed. For example, the SDK can establish connection between an unmanned aircraft and an application on a smart phone (e.g. using an Android system or an iOS system). Following the life cycle of a smart phone system, the callback functions, such as the ones receiving information from the unmanned aircraft, can take advantage of the patterns in the smart phone system and update the statements accordingly to the different stages in the life cycle of the smart phone system.

Figure 12:
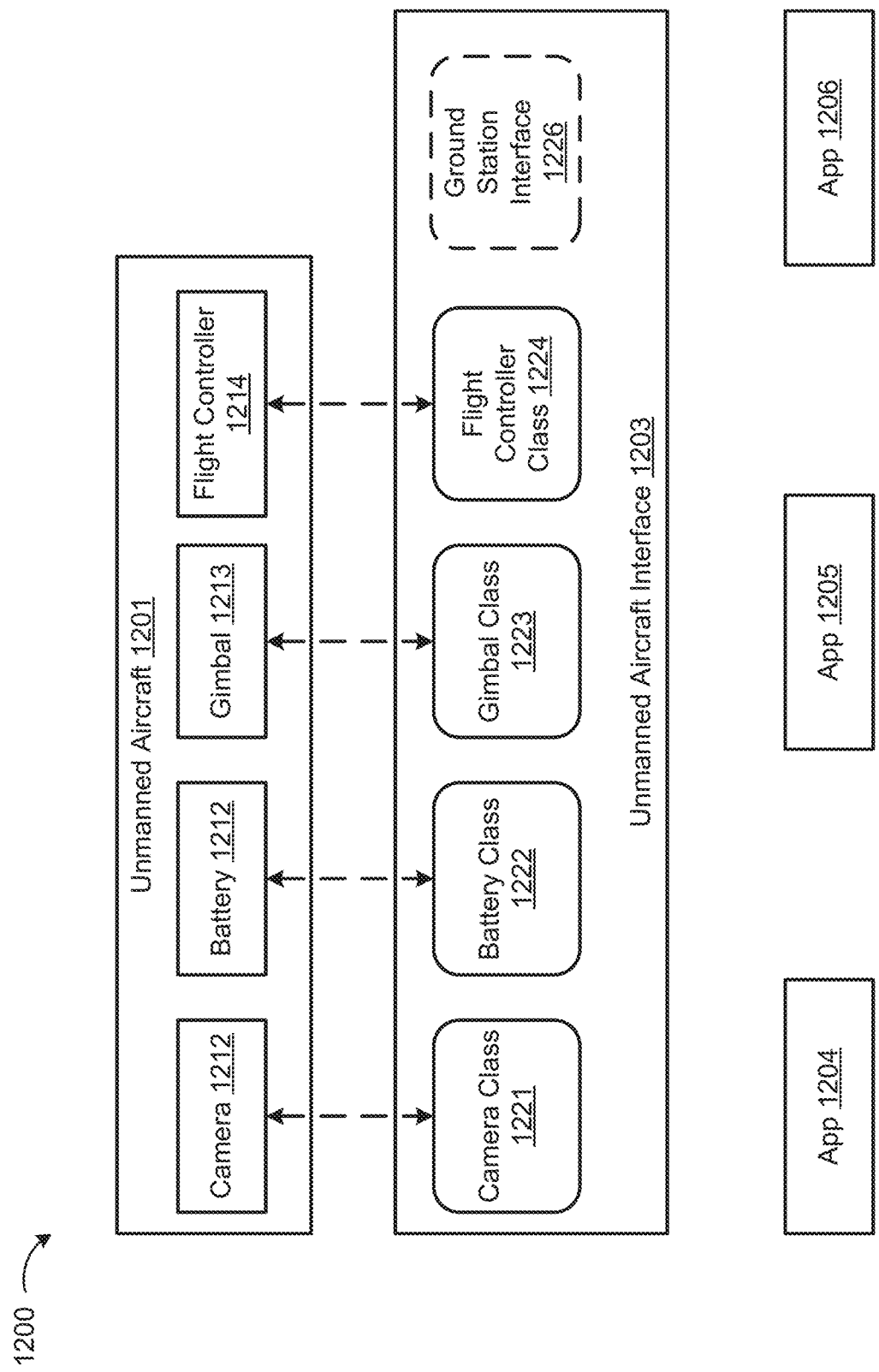
FIG. 12 illustrates an example of an unmanned aircraft interface, in accordance with various embodiments of the present invention.

FIG. 12 illustrates an example of an unmanned aircraft interface, in accordance with various embodiments. As shown in FIG. 12, an unmanned aircraft interface 1203 can represent an unmanned aircraft 1201. Thus, the applications, e.g. APPs 1204-1107, in the unmanned aircraft environment 1200 can access and control the unmanned aircraft 1201. As discussed, these apps may include an inspection app 1204, a viewing app 1205, and a calibration app 1206.

For example, the unmanned aircraft 1201 can include various modules, such as a camera 1211, a battery 1212, a gimbal 1213, and a flight controller 1214.

Correspondently, the movable object interface 1203 can include a camera component 1221, a battery component 1222, a gimbal component 1223, and a flight controller component 1224.

Additionally, the movable object interface 1203 can include a ground station component 1226, which is associated with the flight controller component 1224. The ground station component operates to perform one or more flight control operations, which may require a high-level privilege.

Figure 13:
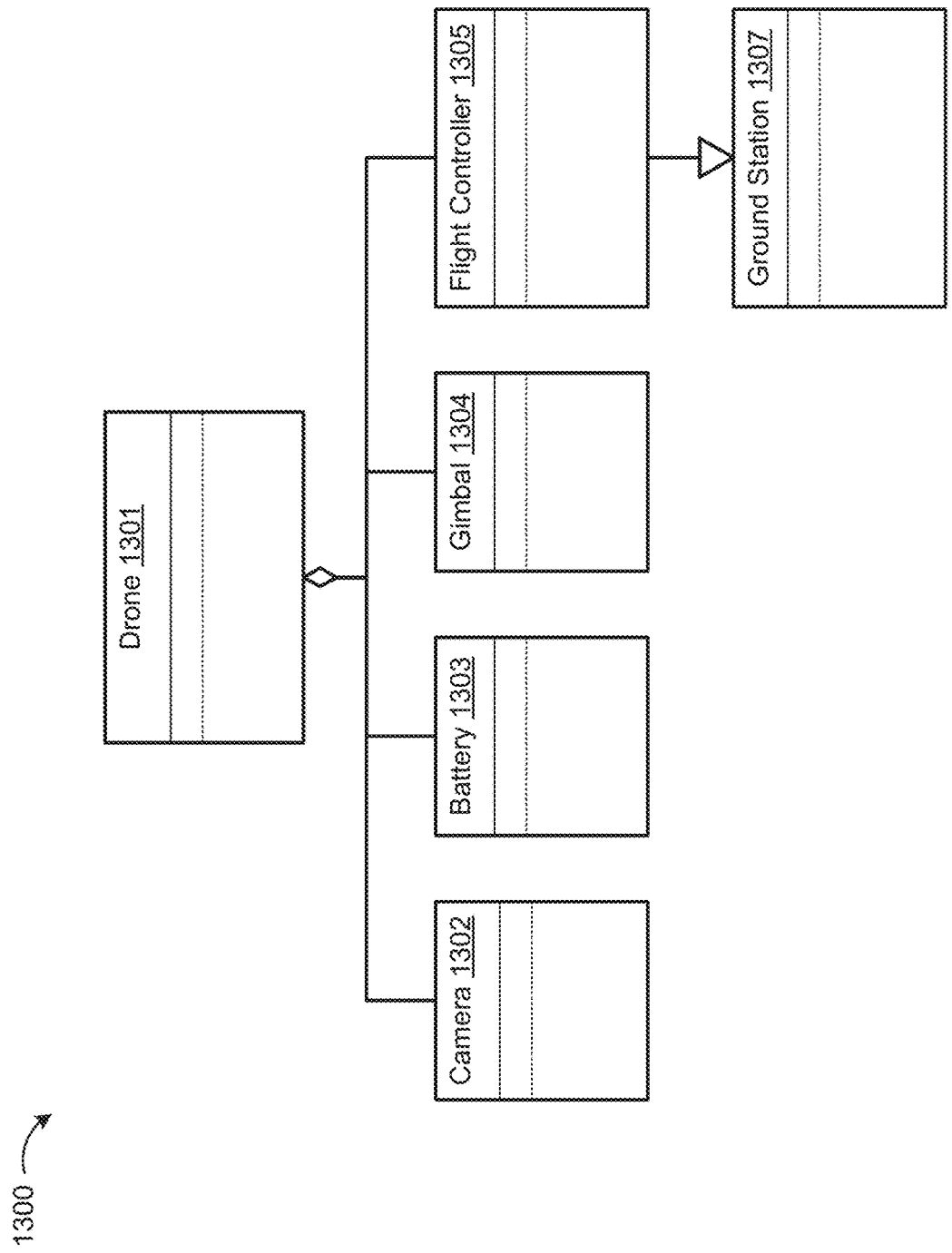
FIG. 13 illustrates an example of components for an unmanned aircraft in a software development kit (SDK), in accordance with various embodiments of the present invention.

FIG. 13 illustrates an example of components for an unmanned aircraft in a software development kit (SDK), in accordance with various embodiments. As shown in FIG. 13, the drone class 1301 in the SDK 1300 is an aggregation of other components 1302-1307 for an unmanned aircraft (or a drone). The drone class 1301, which have access to the other components 1302-1307, can exchange information with the other components 1302-1307 and controls the other components 1302-1307.

In accordance with various embodiments, an application may be accessible to only one instance of the drone class 1301. Alternatively, multiple instances of the drone class 1301 can present in an application.

In the SDK, an application can connect to the instance of the drone class 1301 in order to upload the controlling commands to the unmanned aircraft. For example, the SDK may include a function for establishing the connection to the unmanned aircraft. Also, the SDK can disconnect the connection to the unmanned aircraft using an end connection function. After connecting to the unmanned aircraft, the developer can have access to the other classes (e.g. the camera class 1302 and the gimbal class 1304). Then, the drone class 1301 can be used for invoking the specific functions, e.g. providing access data which can be used by the flight controller to control the behavior, and/or limit the movement, of the unmanned aircraft.

In accordance with various embodiments, an application can use a battery class 1303 for controlling the power source of an unmanned aircraft. Also, the application can use the battery class 1303 for planning and testing the schedule for various flight tasks.

As battery is one of the most restricted elements in an unmanned aircraft, the application may seriously consider the status of battery not only for the safety of the unmanned aircraft but also for making sure that the unmanned aircraft can finish the designated tasks. For example, the battery class 1303 can be configured such that if the battery level is low, the unmanned aircraft can terminate the tasks and go home outright.

Using the SDK, the application can obtain the current status and information of the battery by invoking a function to request information from in the Drone Battery Class. In some embodiments, the SDK can include a function for controlling the frequency of such feedback.

In accordance with various embodiments, an application can use a camera class 1302 for defining various operations on the camera in a movable object, such as an unmanned aircraft. For example, in SDK, the Camera Class includes functions for receiving media data in SD card, getting & setting photo parameters, taking photo and recording videos.

An application can use the camera class 1302 for modifying the setting of photos and records. For example, the SDK may include a function that enables the developer to adjust the size of photos taken. Also, an application can use a media class for maintaining the photos and records.

In accordance with various embodiments, an application can use a gimbal class 1304 for controlling the view of the unmanned aircraft. For example, the Gimbal Class can be used for configuring an actual view, e.g. setting a first personal view of the unmanned aircraft. Also, the Gimbal Class can be used for automatically stabilizing the gimbal, in order to be focused on one direction. Also, the application can use the Gimbal Class to change the angle of view for detecting different objects.

In accordance with various embodiments, an application can use a flight controller class 1305 for providing various flight control information and status about the unmanned aircraft. As discussed, the flight controller class can include functions for receiving and/or requesting access data to be used to control the movement of the unmanned aircraft across various regions in an unmanned aircraft environment.

Using the Main Controller Class, an application can monitor the flight status, e.g. using instant messages. For example, the callback function in the Main Controller Class can send back the instant message every one thousand milliseconds (1000 ms).

Furthermore, the Main Controller Class allows a user of the application to investigate the instance message received from the unmanned aircraft. For example, the pilots can analyze the data for each flight in order to further improve their flying skills.

In accordance with various embodiments, an application can use a ground station class 1307 to perform a series of operations for controlling the unmanned aircraft.

For example, the SDK may require applications to have a SDK-LEVEL-2 key for using the Ground Station Class. The Ground Station Class can provide one-key-fly, on-key-go-home, manually controlling the drone by app (i.e. joystick mode), setting up a cruise and/or waypoints, and various other task scheduling functionalities.

In accordance with various embodiments, an application can use a communication component for establishing the network connection between the application and the unmanned aircraft.

Figure 14:
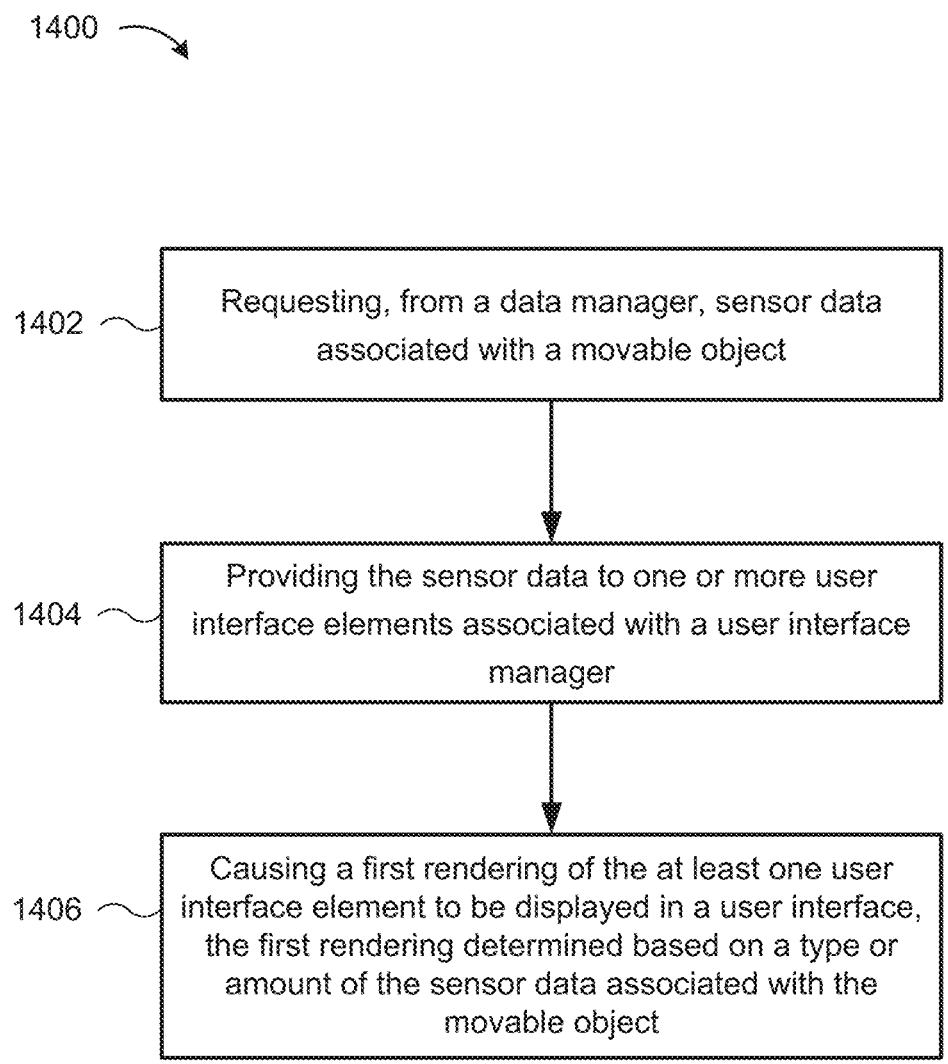
FIG. 14 shows a flowchart of location access management in a movable object environment, in accordance with various embodiments of the present invention.

FIG. 14 shows a flowchart 1400 of user interface management in a movable object environment, in accordance with various embodiments. At step 1402, sensor data associated with a movable object can be requested from a data manager. As discussed, various UI elements can register with a data manager interface of a UI manager, which may receive data from a movable object. In various embodiments, the at least one user interface element can be a widget or a panel including a plurality of user interface elements.

At step 1404, the sensor data may be provided to one or more user interface elements associated with a user interface manager. As discussed, the data interface manager can wait until appropriate data is received before passing the data on to the registered UI elements. As discussed, the at least one interface element can be associated with a transform and an update, and wherein the first rendering is defined by the update and the transform. In some embodiments, the transform converts the sensor data to a displayable value associated with the first rendering.

At step 1406, a first rendering of the at least one user interface element can be caused to be displayed in a user interface, the first rendering determined based on a type or amount of the sensor data associated with the movable object. The first rendering may be determined at least in part based on a position of the at least one user interface element in the user interface. In some embodiments, the first rendering may include a rendering of a panel to be displayed in the user interface including the plurality of user interface elements. The rendering may be determined based on the type or amount of the sensor data associated with the movable object and further based on an update associated with the panel, the update defining how the plurality of user interface elements in the panel are rendered.

In some embodiments, the method may further include requesting, from the data manager, second sensor data associated with a second movable object, providing the second sensor data to the user interface manager, and causing a second rendering of the at least one user interface element to be displayed in the user interface based on a type or amount of the second sensor data associated with the second movable object.

In some embodiments, the method may further include receiving at least one of a custom transform or a custom update associated with the at least one user interface element, and causing the at least one user interface element to be rendered using the at least one of a custom transform or a custom update.

In some embodiments, the movable object is an unmanned aerial vehicle. In some embodiments, the user interface can be displayed on a user device, and the user device may include one of a portable computing device, wearable computing device, virtual reality system, or augmented reality system.

Many features of the present invention can be performed in, using, or with the assistance of hardware, software, firmware, or combinations thereof. Consequently, features of the present invention may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

What is claimed is:

1. A method for providing user interface management in a movable object environment, comprising:

registering at least one user interface element associated with a user interface manager with a data manager interface on a user device, the data manager interface providing an abstraction layer for communication between the at least one user interface element and a data manager that receives sensor data from a plurality of sensors associated with a plurality of different movable object hardware configurations;

requesting, from the data manager on the user device, sensor data associated with a movable object, the sensor data received from a plurality of sensors on the movable object having a plurality of data formats, the data manager generating converted sensor data by reformatting the sensor data from the plurality of data formats to a common data format;

providing the converted sensor data by the data manager interface to the at least one user interface element registered with the data manager interface asynchronously as the converted sensor data is available from the data manager, the at least one user interface element associated with a position in a first portion of a user interface where the at least one user interface element is to be rendered; and causing a first rendering of the at least one user interface element from a plurality of renderings of the at least one user interface element to be displayed at the position in the user interface, the user interface rendered on a display of the user device in wireless communication with the movable object, the first rendering determined based on a type or amount of the converted sensor data associated with the movable object and the position in the user interface, wherein the type or amount of the converted sensor data is based on a first hardware configuration of the movable object, the first hardware configuration comprising a first type or quantity of sensors coupled to the movable object, and wherein at least two of the plurality of renderings represent a data value associated with the type or amount of the converted sensor data.

2. The method of claim 1, wherein the at least one user interface element is associated with a transform and an update, and wherein the first rendering is defined by the update and the transform.

3. The method of claim 2, wherein the transform converts the converted sensor data to a displayable value associated with the first rendering.

4. The method of claim 2, wherein a second rendering of the user interface element is associated with positions in a second portion of the user interface.

5. The method of claim 1, wherein the at least one user interface element is a panel including a plurality of user interface elements.

6. The method of claim 5, wherein causing a first rendering of the at least one user interface element to be displayed in a user interface, the first rendering determined based on a type or amount of the converted sensor data associated with the movable object comprises:
causing a rendering of the panel to be displayed in the user interface including the plurality of user interface elements, the rendering determined based on the type or amount of the converted sensor data associated with the movable object and further based on an update associated with the panel, the update defining how the plurality of user interface elements in the panel are rendered.

7. The method of claim 1, further comprising:
requesting, from the data manager, second sensor data associated with a second movable object having a second hardware configuration;
providing the second sensor data to the data manager; and
causing a second rendering of the at least one user interface element to be displayed in the user interface based on a type or amount of the second sensor data corresponding to the second hardware configuration of the second movable object.

8. The method of claim 1, further comprising:
receiving at least one of a custom transform or a custom update associated with the at least one user interface element; and
causing the at least one user interface element to be rendered using the at least one of a custom transform or a custom update.

9. The method of claim 1, wherein the movable object is an unmanned aerial vehicle.

10. The method of claim 1, wherein the user device is one of a portable computing device, wearable computing device, virtual reality system, or augmented reality system.

11. A system for user interface management in a movable object environment, comprising:
at least one movable object; and
a user device including
a display,
one or more processors, and
a memory that stores one or more computer-executable instructions which, when executed by the one or more processors, cause the system to:
register at least one user interface element associated with a user interface manager with a data manager interface on the user device, the data manager interface providing an abstraction layer for communication between the at least one user interface element and a data manager that receives sensor data from a plurality of sensors associated with a plurality of different movable object hardware configurations;
request, from the data manager on the user device, sensor data associated with the at least one movable object, the user device in wireless communication with the at least one movable object, the sensor data received from a plurality of sensors on the movable object having a plurality of data formats, the data manager generating converted sensor data by reformatting the sensor data from the plurality of data formats to a common data format;
provide the converted sensor data by the data manager interface to the at least one user interface element registered with the data manager interface asynchronously as the converted sensor data is available from the data manager, the at least one user interface element associated with a position in a first portion of a user interface where the at least one user interface element is to be rendered; and
cause a first rendering of the at least one user interface element from a plurality of renderings of the at least one user interface element to be displayed at the position in the user interface, the user interface rendered on a display of the user device in wireless communication with the movable object, the first rendering determined based on a type or amount of the converted sensor data associated with the movable object and the position in the user interface, wherein the type or amount of the converted sensor data is based on a first hardware configuration of the movable object, the first hardware configuration comprising a first type or quantity of sensors coupled to the movable object, and wherein at least two of the plurality of renderings represent a data value associated with the type or amount of the converted sensor data.

12. The system of claim 11, wherein the at least one user interface element is associated with a transform and an update, and wherein the first rendering is defined by the update and the transform.

13. The system of claim 12, wherein the transform converts the converted sensor data to a displayable value associated with the first rendering.

14. The system of claim 11, wherein the one or more computer-executable instructions, when executed by the one or more processors, further cause the system to:
request, from the data manager, second sensor data associated with a second movable object having a second hardware configuration;
provide the second sensor data to the data manager; and
cause a second rendering of the at least one user interface element to be displayed in the user interface based on a type or amount of the second sensor data corresponding to the second hardware configuration of the second movable object.

15. The system of claim 11, wherein the one or more computer-executable instructions, when executed by the one or more processors, further cause the system to:
receive at least one of a custom transform or a custom update associated with the at least one user interface element; and
cause the at least one user interface element to be rendered using the at least one of a custom transform or a custom update.

16. The system of claim 11, wherein the at least one movable object is an unmanned aerial vehicle.

17. The system of claim 11, wherein the user device is one of a portable computing device, a wearable computing device, a virtual reality system, or an augmented reality system.

18. A non-transitory computer readable storage medium including instructions stored thereon which, when executed by one or more processors, cause the one or more processors to:
register at least one user interface element associated with a user interface manager with a data manager interface on a user device, the data manager interface providing an abstraction layer for communication between the at least one user interface element and a data manager that receives sensor data from a plurality of sensors associated with a plurality of different movable object hardware configurations;

request, from the data manager on the user device, sensor data associated with a movable object, the sensor data received from a plurality of sensors on the movable object having a plurality of data formats, the data manager generating converted sensor data by reformatting the sensor data from the plurality of data formats to a common data format;

provide the converted sensor data by the data manager interface to the at least one user interface element registered with the data manager interface asynchronously as the converted sensor data is available from the data manager, the at least one user interface element associated with a position in a first portion of a user interface where the at least one user interface element is to be rendered; and cause a first rendering of the at least one user interface element from a plurality of renderings of the at least one user interface element to be displayed at the position in the user interface, the user interface rendered on a display of the user device in wireless communication with the movable object, the first rendering determined based on a type or amount of the converted sensor data associated with the movable object and the position in the user interface, wherein the type or amount of the converted sensor data is based on a first hardware configuration of the movable object, the first hardware configuration comprising a first type or quantity of sensors coupled to the movable object, and wherein at least two of the plurality of renderings represent a data value associated with the type or amount of the converted sensor data.

19. The non-transitory computer readable storage medium of claim 18, wherein the at least one user interface element is associated with a transform and an update, and wherein the first rendering is defined by the update and the transform.

20. The non-transitory computer readable storage medium of claim 19, wherein the transform converts the converted sensor data to a displayable value associated with the first rendering.

21. The non-transitory computer readable storage medium of claim 18, wherein the instructions, when executed by the one or more processors, further cause the one or more processors to:

request, from the data manager, second sensor data associated with a second movable object having a second hardware configuration;

provide the second sensor data to the data manager; and cause a second rendering of the at least one user interface element to be displayed in the user interface based on a type or amount of the second sensor data corresponding to the second hardware configuration of the second movable object.

22. The non-transitory computer readable storage medium of claim 18, wherein the instructions, when executed by the one or more processors, further cause the one or more processors to:

receive at least one of a custom transform or a custom update associated with the at least one user interface element; and cause the at least one user interface element to be rendered using the at least one of a custom transform or a custom update.

23. The non-transitory computer readable storage medium of claim 18, wherein the user device is one of a portable computing device, wearable computing device, virtual reality system, or augmented reality system.

24. A system comprising:

a user device including one or more processors, the user device in wireless communication with a movable object;

a data manager, executing on the one or more processors, to receive sensor data from the movable object, the sensor data received from a plurality of sensors on the movable object having a plurality of data formats, the data manager to generate converted sensor data by reformatting the sensor data from the plurality of data formats to a common data format;

a data manager interface, executing on the one or more processors, to receive the converted sensor data from the data manager and to provide the converted sensor data to one or more user interface elements of one or more applications executing on the user device, the data manager interface providing an abstraction layer for communication between the user interface elements and the data manager that receives the sensor data associated with a plurality of different movable object hardware configurations; and a library of user interface (UI) elements to register at least one user interface element with the data manager interface and to receive the converted sensor data corresponding to the sensor data from the data manager asynchronously as the converted sensor data is available from the data manager, wherein the UI elements are rendered in a user interface based on the converted sensor data received from the data manager, wherein a particular UI element is associated with a plurality of renderings including at least two renderings that represent a data value associated with a type or amount of the converted sensor data, and wherein the converted sensor data received from the data manager is based on a hardware configuration of the movable object, the hardware configuration comprising a first type or quantity of sensors coupled to the movable object.

25. The system of claim 24, wherein an appearance or functionality of each UI element from the library of UI elements is customizable.

26. The system of claim 25, the library of UI elements includes at least one grouping of a subset of UI elements, wherein the at least one grouping is further customizable.

27. The system of claim 24, wherein the library of UI elements register with the data manager to receive the data corresponding to the sensor data.

28. The system of claim 27, wherein the data manager receives the sensor data from the movable object independently of a request from the library of UI elements.

29. The system of claim 24, wherein the user interface is displayed on a display connected to the user device, and wherein the user device is one of a portable computing device, wearable computing device, virtual reality system, or augmented reality system.

* * * * *